United States Patent [19]

Roch

[11] 4,242,019
[45] Dec. 30, 1980

[54] MILLING MACHINE

[76] Inventor: Gerald V. Roch, 8041 Fishback Rd., Indianapolis, Ind. 46268

[21] Appl. No.: 880,640

[22] Filed: Feb. 23, 1978

[51] Int. Cl.³ .............................. B23C 5/26; B23C 1/06
[52] U.S. Cl. .................................... 409/185; 308/6 C; 409/233; 409/235; 409/145
[58] Field of Search ............ 90/11 R, 14, 21 R, 11 A, 90/11 D; 408/239 A, 239 R; 308/6 C; 409/231, 233

[56] References Cited

U.S. PATENT DOCUMENTS

| | | | |
|---|---|---|---|
| 2,033,749 | 3/1936 | Walter | 409/231 X |
| 2,988,965 | 6/1961 | Armitage et al. | 90/11 R |
| 3,044,835 | 7/1962 | Hurd | 308/6 C |
| 3,220,313 | 11/1965 | Schroeder | 90/11 D |
| 3,311,426 | 3/1967 | Binns | 308/6 C |
| 3,459,069 | 8/1969 | Grover | 90/14 X |
| 3,511,545 | 5/1970 | Brettrager | 308/6 C |
| 3,520,228 | 7/1970 | Wohlfeil | 90/11 D |
| 3,552,264 | 1/1971 | Meinke | 90/14 X |
| 3,564,970 | 4/1969 | Larsen | 308/6 C X |
| 3,673,918 | 7/1972 | Zankl | 90/11 R |
| 3,757,637 | 9/1973 | Eich et al. | 90/11 D |

FOREIGN PATENT DOCUMENTS 971319 9/1964 United Kingdom .
1163980 9/1969 United Kingdom .

*Primary Examiner*—Horace M. Culver
*Attorney, Agent, or Firm*—Woodard, Weikart, Emhardt & Naughton

[57] ABSTRACT

A milling machine includes a C-shaped frame, tool support member movable in a vertical direction, a saddle member movable in a transverse direction, a work table movable in a longitudinal direction, a tool drive unit and two oppositely positioned and removable bearing ways associated with each direction of travel. For the vertical axis the bearing ways are between the C-shaped frame and the tool support member. The tool drive unit includes a hollow tool spindle and a drive motor with a vertically extending hollow output shaft which is rigidly and coaxially connected to the hollow tool spindle. Each vertical axis bearing way longitudinally extends in a vertical direction and includes an outer race portion attached to the C-shaped frame and a ball circulating track portion attached to the tool support member. Reciprocating relative motion between the tool support member and the C-shaped frame occurs at the two bearing way locations and the drive motor for the tool moves with the hollow tool spindle in a vertical direction.

22 Claims, 9 Drawing Figures

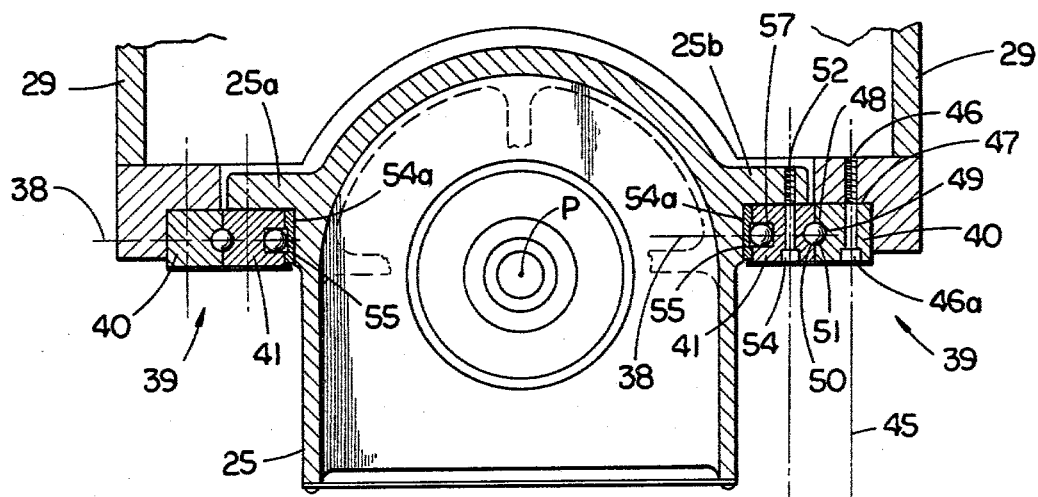
FIG. 5
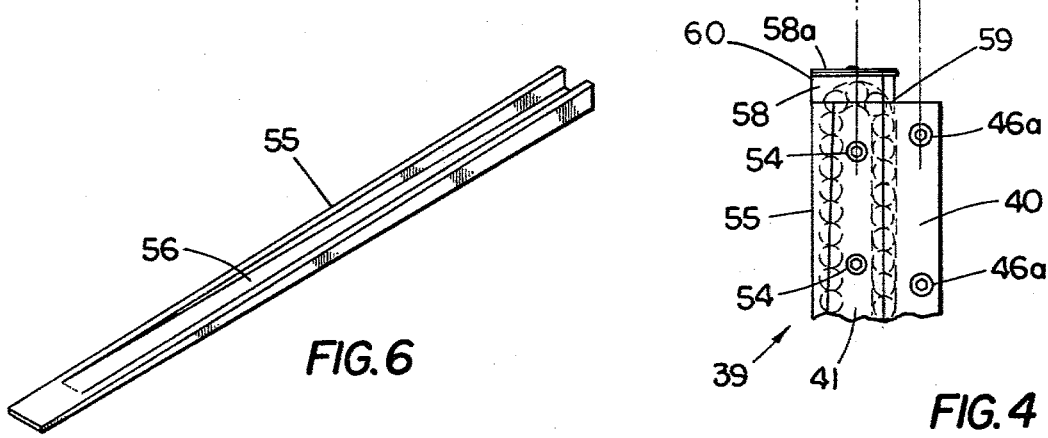
FIG. 6
FIG. 4
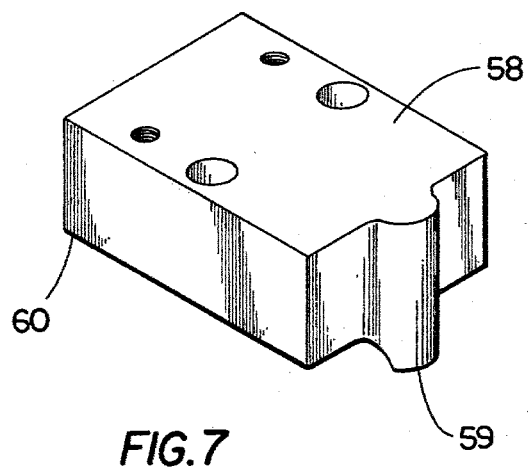
FIG. 7

MILLING MACHINE

BACKGROUND OF THE INVENTION

This invention relates in general to milling machines and in particular to three-axis milling machines.

The technology associated with machine tools is extensive and diverse. Known in the art are one, two and three-axis machines, some of which grind or mill, others of which drill or bore. The types of attachments and options are almost as varied as the number of different machines. The following list of patents gives a brief indication of some of these various types of machines and features:

| U.S. Pat. No. | Patentee | Issue Date |
| --- | --- | --- |
| 3,555,963 | Evans | 1/19/71 |
| 3,617,142 | DeWane | 11/02/71 |
| 3,157,283 | Maass et al. | 11/17/64 |
| 2,963,057 | Morse | 12/06/60 |
| 2,883,890 | Fink et al. | 4/28/59 |
| 2,365,068 | Gerbig | 12/12/44 |

Evans discloses a multiple spindle transfer machine having a removable spindle tool holder and in which a single drive motor is used to drive each spindle through a gearing arrangement. The entire tool head moves in a vertical direction by means of a worm gear and pinion drive using guides and slides on each side thereof.

DeWane also discloses a vertically movable head in which a DC drive motor is geared to drive the tool spindle. The head is mounted to the structure by a slideway arrangement and movement occurs by use of a counterbalancing weight and pulley arrangement.

Each of these patents disclose conventional slideway or guide means for controlling the alignment of the vertical travel. Such means require accurate machining, lubrication and major overhaul by replacement or remachining when they become worn. Furthermore, each of these two patents utilize gearing to transfer the rotary motion of the motor shaft to drive the tool spindle.

The remaining four patents are listed as being of only general applicability to conventional three-axis machine tools. Each of these patents disclose a particular unique application or feature which might be associated with a particular machine tool.

The following list of patents deals with drive units and mechanisms which have hollow shaft motors or the like:

| U.S. Pat. No. | Patentee | Issue Date |
| --- | --- | --- |
| 1,636,560 | Hall | 7/19/27 |
| 1,967,045 | Wehmeyer | 7/17/34 |
| 2,500,175 | Guthrie | 3/14/50 |
| 2,571,267 | Ljunggren | 10/16/51 |
| 2,703,847 | Kalikow | 3/08/55 |
| 2,772,546 | Barrows | 12/04/56 |
| 3,854,063 | Bergman | 12/10/74 |
| 3,987,322 | Bourgain et al. | 10/19/76 |
| 2,714,866 | Pleuger et al. | 8/09/55 |

The Hall patent discloses a hollow shaft motor employed for a valve seat grinder in which the hollow shaft is used to accommodate a pilot stem.

The Wehmeyer patent relates to machine tools only in that it includes a chuck-operating motor which is mounted on a lathe spindle.

The Ljunnggren patent discloses a thread-spinning spindle having a hollow shaft motor drive for the blade which drives the spool through a flexible coupling.

The remaining patents are of only general applicability in that they do not relate to conventional drive motors for use with three-axis machine tools. In addition, none of these listed patents involves the concept of the coaxial coupling of a conventional solid output shaft of a motor to a hollow tool chucking spindle. This particular coaxial coupling concept provides the advantages of individually replaceable parts, without having to replace the entire assembly, and the ability to use standard, commerically available motors.

U.S. Pat. No. 2,028,727 issued Jan. 21, 1936 to Perry et al. discloses a particular construction of machine tools wherein the tools are distinctly segregated into a number of major structural units. One aspect of this segregation is that the tool head is readily detachable from a saddle member and the saddle member is readily detachable from the vertical support column of the subject machine tool. Although the saddle member is slidable on the ways of the vertical column, this design in no way solves the problems of machining accuracy, lubrication and wear associated with such slide and guide arrangements as previously discussed.

The following two listed patents are of only general interest and are not believed to be relevant to three-axis machine tools:

| U.S. Pat. No. | Patentee | Issue Date |
| --- | --- | --- |
| 2,734,359 | Mulheim | 2/14/56 |
| 2,242,475 | Misuraca | 5/20/41 |

SUMMARY OF THE INVENTION

A milling machine according to one embodiment of the present invention comprises a C-shaped frame, a tool support member movable in a vertical direction, a saddle member positioned beneath the tool support member atop the lower arm (or base) of the "C" of the frame and movable in a transverse direction, a work table positioned atop the saddle member and movable in a longitudinal direction, a tool drive unit supported by and movable with the tool support member and a first plurality of anti-friction bearing ways spaced about the tool support member and positioned between the C-shaped frame and the tool support member. Direct motor drive of a hollow spindle by a hollow shaft motor is provided, simplifying head construction and facilitating addition of automatic tool changer means.

One object of the present invention is to provide an improved milling machine.

Related objects and advantages of the present invention will be apparent from the following description.

BRIEF DESCRIPTION OF THE DRAWINGS

FIG. 4 is a section view of a ball bearing way comprising a portion of the FIG. 1 milling machine taken along line 4—4 in FIG. 2.

FIG. 5 is a section view of the FIG. 4 ball bearing way taken along line 5—5 in FIG. 1.

FIG. 6 is a perspective view of a tapered wedge comprising a portion of the FIG. 1 milling machine.

FIG. 7 is a perspective view of a ball bearing guide cap comprising a portion of the FIG. 1 milling machine.

DESCRIPTION OF THE PREFERRED EMBODIMENT

Figure 1:
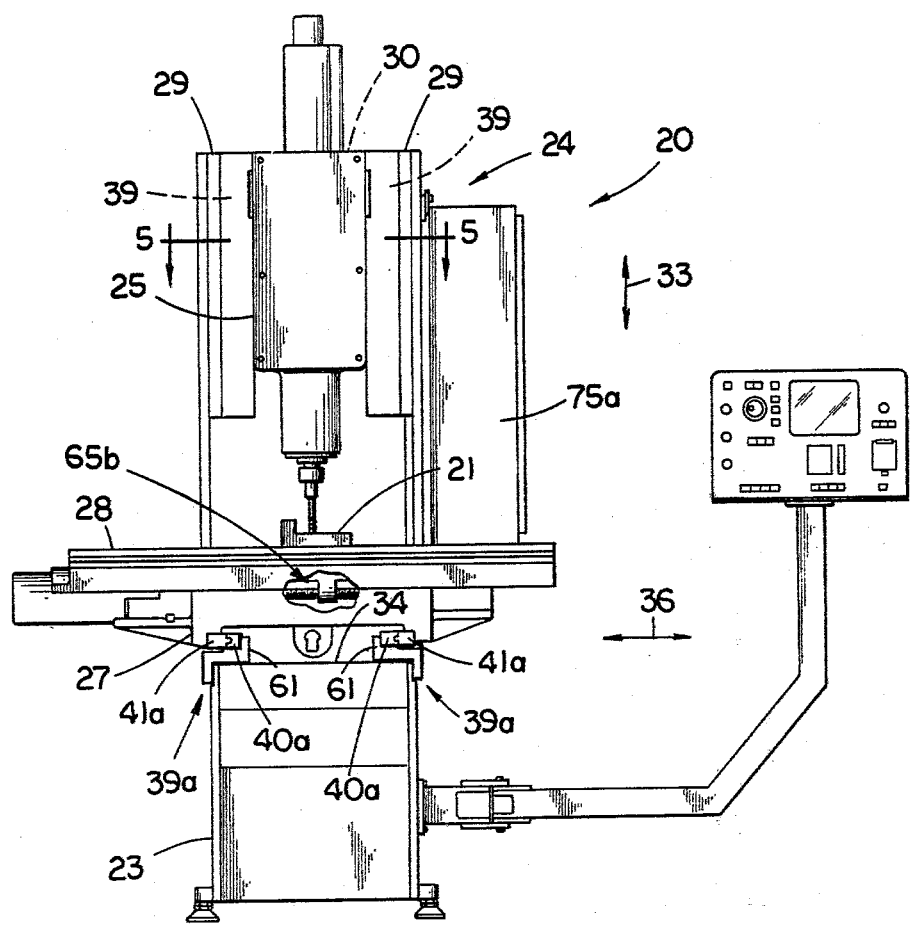
FIG. 1 is a front view of a milling machine according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
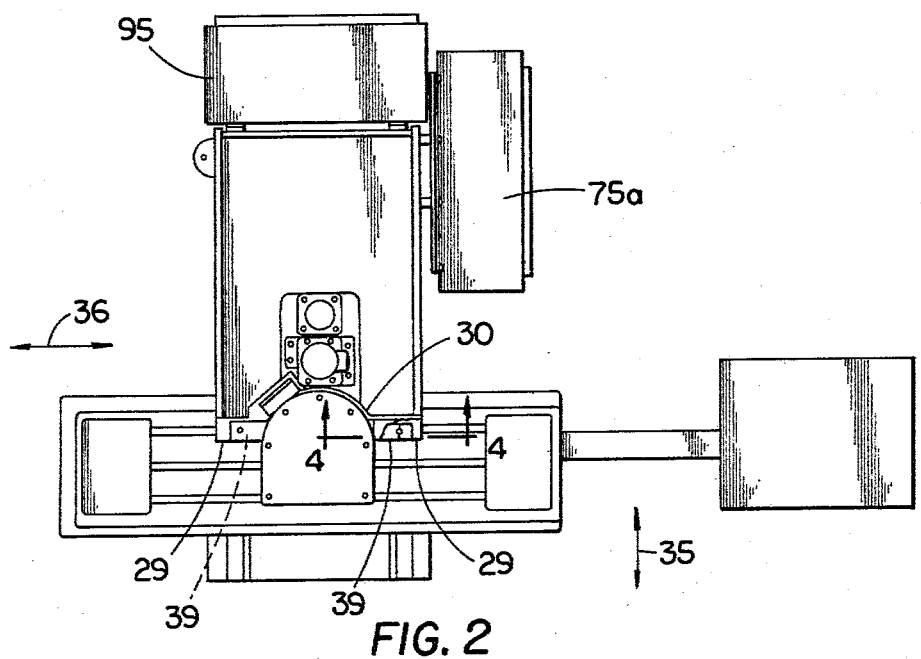
FIG. 2 is a top view of the FIG. 1 milling machine.
Figure 3:
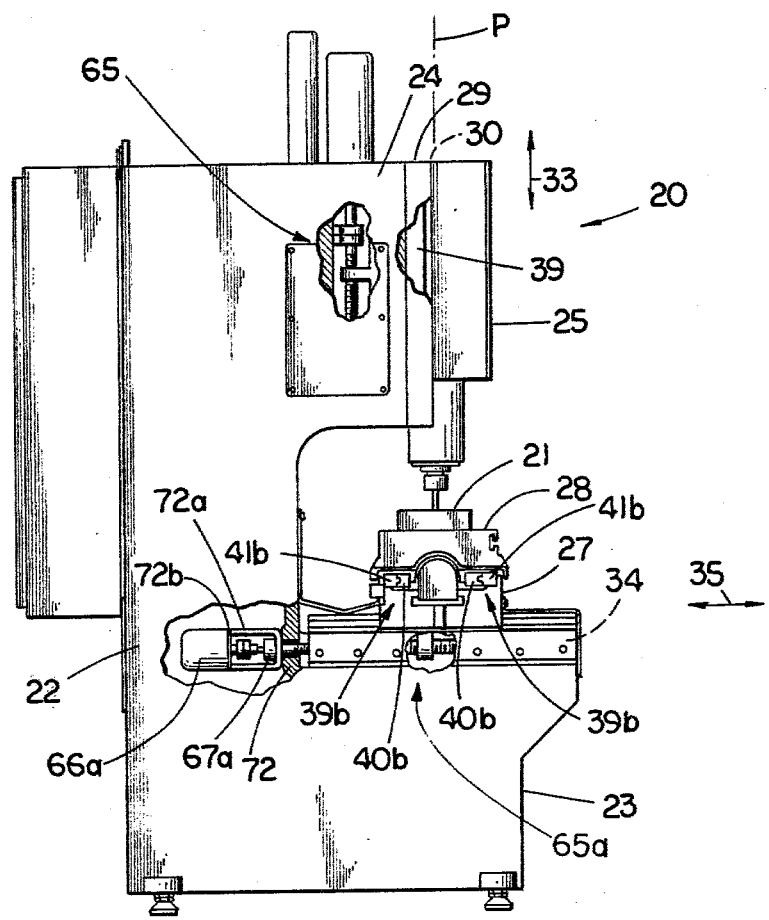
FIG. 3 is a side view of the FIG. 1 milling machine with portions in section to show internal features.

Referring to FIGS. 1, 2 and 3, milling machine 20 is oriented as it would be when in use for the machining of a particular workpiece 21. Milling machine 20 includes a C-shaped frame 22 having a base portion 23 and an overhanging upper portion 24, a tool support member 25, a saddle member 27 and a work table 28. The C-shaped frame is a steel weldment which is structured and machined so as to accommodate various controls, attachments and drive systems which are necessary for the operation of milling machine 20. The overhanging upper portion 24 includes a pair of outwardly extending arms 29, one on each side of upper portion 24, and a recessed area 30 therebetween. These two arms 29 support tool support member 25 and provide means for reciprocating vertical travel in the direction of arrow 33 while the entire C-shaped frame and in particular base portion 23 remain rigid and stationary. Above the upper surface 34 of base portion 23 there is housed an appropriate drive mechanism for the transverse movement of saddle member 27 in the direction of arrow 35. A further drive mechanism is positioned between saddle member 27 and work table 28 so as to effect longitudinal travel of work table 28 in the direction of arrow 36 (see FIG. 2). These various drive systems, which will be desribed in detail hereinafter, and their corresponding directions of movement mean that milling machine 20 is similar to a conventional three-axis machine with arrow 36 indicating the X direction of travel, arrow 35 indicating the Y direction of travel and arrow 33 indicating the Z direction of travel. It is noted that, regardless of the direction of movement or the combination of movements during a machining operation, the C-shaped frame remains stationary and there is no relative movement of any major structural portion of that frame. With conventional column-and-knee-type milling machines, the relative movement in the vertical direction between the workpiece and the tool spindle is typically controlled by raising or lowering the knee platform, which supports the work table and saddle member, by means of a motor-driven lead screw and nut combination. The spindle may also have a smaller vertical travel inside of a stationary quill or head. The present invention represents a departure from this conventional column-and-knee-type design because the tool support member, rather than a knee, is movable in the vertical direction and a rigid C-frame extends from below the spindle axis to points on both sides of the spindle in a vertical plane immediately adjacent the spindle axis. Thus, the support for the saddle and table is much more rigid than usual, enabling achievement of greater machining accuracies with the machine than would otherwise be possible. As a workpiece is positioned and moved in the transverse and longitudinal directions, milling or other machining of that workpiece is accomplished by lowering the entire tool support member to its point of machining contact with the particular workpiece and then causing movement along whichever axes are desired, depending on the particular task at hand. There is no vertical movement of the saddle member 27 and work table 28.

Tool support member 25 is suspended by and between outwardly extending arms 29. Positioned on opposite sides of tool support member 25 are two ball bearing ways 39. Each ball bearing way 39 (see FIGS. 4 and 5) includes an outer race portion 40 and an elongated ball circulating track 41 having a tapered surface alone one side. Each outer race portion 40 is rigidly attached by means of conventional fasteners such as socket head capscrews, to the corresponding outwardly extending arm 29 while the ball circulating track is rigidly attached, also with conventional fasteners, such as socket head cap screws, to the tool support member 25. By means of a suitable drive system, such as a ball lead screw and recirculating ball nut system, tool support member 25 is raised and lowered for travel in the vertical direction with the relative motion between tool support member 25 and the C-shaped frame 22 (outwardly extending arms 29) occurring at the location of ball bearing ways 39. Each bearing way 39 is independently removable from the milling machine 20, by means of conventional small hand tools, so that when there is ball bearing fatigue or failure or other structural damage to some portion of either bearing way 39, the affected bearing way can be independently replaced without the necessity to tear down, remachine or otherwise conduct a major overhaul of the milling machine.

The two ball bearing ways 39 used for vertical travel of tool support member 25 are installed and preloaded so that there is the equivalent of zero running clearance between tool support member 25 and the C-shaped frame 22. In order to achieve this zero running clearance and maintain rigid structural strength, a special installation procedure is used.

Each outwardly extending arm 29 has a vertically extending series of internally threaded bolt holes 46 whose location is indicated by line 45. These bolt holes 46 are used to rigidly secure outer races 40 into the L-shaped recess 47 of each arm 29 by means of suitable threaded fasteners passed through clearnace holes 46a of outer race 40. Each outer race 40 has a semicircular channel 48 which carries a continuous series of ball bearings 49. For proper ball bearing movement within each bearing way 39, outer race 40 and circulating track 41 are mounted to their respective structural supports so that semicircular channels 50 (of track 41) and 48 (of race 40) cooperate to form a circular passageway 51 having a size slightly larger than the diameter of the ball bearings 49 therein.

Each flange member 25a and 25b of tool support member 25 has a series of internally threaded bolt holes 52 whose location is indicated by line 53. Before circulating track 41 can be rigidly fastened in place to flange members 25a and 25b, the spacing between lines 45 and 53 must be accurately set so that semicircular channels 48 and 50 are positioned to form circular passageway 51. Due to machining tolerances, the dimensional spread between lines 45 and 53 on each side of tool support member 25 may vary by plus or minus a few thousandths of an inch. Consequently, after each outer race 40 is rigidly fastened to its corresponding outwardly extending arm 29, any spacing variations must be accounted for by movement of track 41. Track 41 has a series of clearance holes 54 which are substantially coincident with internally threaded bolt holes 52. Clearance holes 54 are large enough to permit a slight lateral shift of track 41 while still providing sufficient overlap with bolt holes 52 for suitable threaded fasteners to pass through the clearance holes 54 and be threadedly received by the bolt holes 52. In order to provide a rigid structure for supporting circular track 41 and to accommodate these tolerance variations, a built-in, tapered void 54a is provided on each side between circulating track 41 and tool support member 25. Placed within each void 54a is a tapered wedge 55 (see FIG. 6) which, when tapped downwardly into position pushes circulating track 41 into proper position with respect to outer race 40. Once this is done, the threaded fasteners selected for joining circulating track 41 to tool support member 25 (through holes 54 and 52) are tightened in place. Extending lengthwise in the approximate center of one surface of tapered wedge 55 is a ball bearing groove 56 which provides a hard bearing surface for that contact which may be made with the circulating ball bearings in trough 57 of track 41.

Ball bearings 49 extend in a continuous loop throughout circular passageway 51 and trough 57. When there is upward vertical movement of tool support member 25, these ball bearings rotate about their own axis as well as travel in a clockwise direction (in the right-hand track 41, counterclockwise in the left-hand track 41) through the continuous loop. When the vertical movement of tool support member 25 is downward, there is a counterclockwise ball bearing travel in the right-hand track 41. Inasmuch as outer race 40 and circulating track 41 are generally rectangular members, the oblong, curved end appearance of this continuous loop is provided by securing a ball bearing guide cap 58 (see FIG. 7) to each end of bearing ways 39. Cap 58 has a semicircular, tapered edge 59 on one side so as to fit into and against the inner surface of semicircular channel 48 of outer race 40 while the opposite edge 60 of cap 58 is squared off and fits atop the corresponding end of circulating track 41. As tool support member 25 moves vertically, the ball bearings move in either a clockwise or counterclockwise direction and are guided out of circular passageway 51 and into trough 57 by means of edge 59. Each cap 58 has a curved inner portion which accepts the ball bearings and accommodates their travel from one side of the continuous loop to the other side. Each cap 58 is secured to a different end of circulating track 41 by threaded fasteners. Each cap is easily removable in order to facilitate both the initial loading of the ball bearings as well as the replacement of worn bearings which may be required at a later time. Attached to the end of each cap 58 is a wiper 58a which slides across semicircular channel 48 wiping off dirt and other contaminants prior to contact by the ball bearings.

Each ball bearing guideway 39 has a plane of vertical travel indicated by line 38 (FIG. 5). Inasmuch as lines 38 (planes) are coincident with each other they can be thought of as lying within a common plane. An important feature of the disclosed milling machine is that this common plane coincides closely with the rotational axis "P" (FIG. 5) of the tool support spindle. In the disclosed embodiment the actual distance of separation between point P and the plane common to lines 38 is less than one inch. This relationship eliminates any cantilever effects which might otherwise exist if the plane of vertical travel and the axis of the tool support member were widely separated.

The description of ball bearing ways 39 is typical for each of the three axes. As noted, relative motion in the vertical direction occurs between tool support member 25 and outwardly extending arms 29 of the C-shaped frame 22. Another pair of ball bearing ways 39a is located between surface 34 and saddle member 27 wherein the outer races 40a are attached to the upright stationary brackets 61 and the movable circulating tracks 41a are attached to saddle member 27. Similarly, the final pair of ball bearing ways 39b are located between saddle member 27 and work table 28, with the outer races 40b being attached to work table 28 while the movable circulating tracks 41b are attached to the saddle member 27. The structural details of each pair of ball bearing ways 39, 39a and 39b are identical except for their differences in overall length which is governed by the selected extent of travel in each axis and the particular design of the milling machine. Vertical travel is approximately 14 inches, transverse travel approximately 13 inches and longitudinal travel approximately 26 inches. It is conceivable that types of anti-friction bearing means other than ball bearings might be usable in certain combinations. Some examples of other anti-friction bearings are roller bearings and needle bearings. It is believed that ball bearings provide the best combination of benefits.

Figure 8:
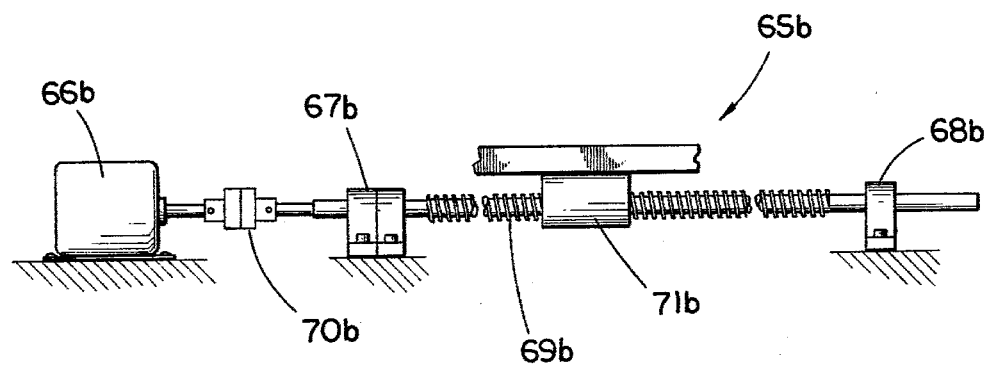
FIG. 8 is a diagrammatic illustration of a lead screw drive system comprising a portion of the FIG. 1 milling machine.

Associated with each pair of ball bearing ways 39, 39a and 39b and their corresponding axis is a ball lead screw and recirculating ball nut drive system 65, 65a and 65b respectively, (see FIG. 8). Each drive system, 65, 65a and 65b is of virtually the same construction, the one difference being the length of the ball lead screw which corresponds to the extent of travel possible for the particular milling machine axis with which the drive system is associated. Another difference is that the X-axis drive system 65b extends over a greater distance and requires two end support bearings (67b and 68b) while the Y-axis and Z-axis drive systems 65a and 65, respectively, are shorter in length and require only one end supporting bearing. Only drive system 65b will be described in detail, it being understood that systems 65a and 65 are substantially the same.

Mounted to the stationary member is a DC drive motor 66b, an oppositely facing pair of angular contact ball bearings 67b and ball bearing 68b. The use of oppositely facing angular contact ball bearings permits the handling of thrust loads occurring in both directions. For the vertical (Z) axis, this stationary member is C-shaped frame 22. For the longitudinal (X) axis, this stationary member is saddle member 27. For the transverse (y) axis, this stationary member is the internal vertical surface 72 at the throat of C-shaped frame 22. It should be noted that the arrangement of the FIG. 8 drive system is modified slightly for the transverse axis in that a U-bracket 72a mounted to surface 72 and a cover plate 72b attaches to the open end of the U-bracket. The end of motor 66a mounts to cover plate 72b, and within U-bracket 72a, support bearings 67a are positioned.

A suitable motor for these lead screw drives is a model E-703 permanent magnet DC motor offered by Electro-Craft Corporation of Hopkins, Minnesota. Drive system 65b further includes a ball lead screw 69b, alignment coupling 70b and recirculating ball nut 71b. Ball nut 71b is rigidly secured to the movable member which for the vertical axis is tool support member 25, for the transverse axis is saddle member 27 and for the longitudinal axis is work table 28. As the output shaft of motor 66b rotates at a selectable speed, alignment coupling 70b transmits the rotary motion to the lead screw 69b, which is threadedly received within recirculating ball nut 71b, and causes the corresponding movable member to travel along the lead screw. Lead screw 69b is supported at opposite ends by ball bearings 67b and ball bearing 68b to insure straight alignment and a smooth, continuous movement in response to motor 66b.

Figure 9:
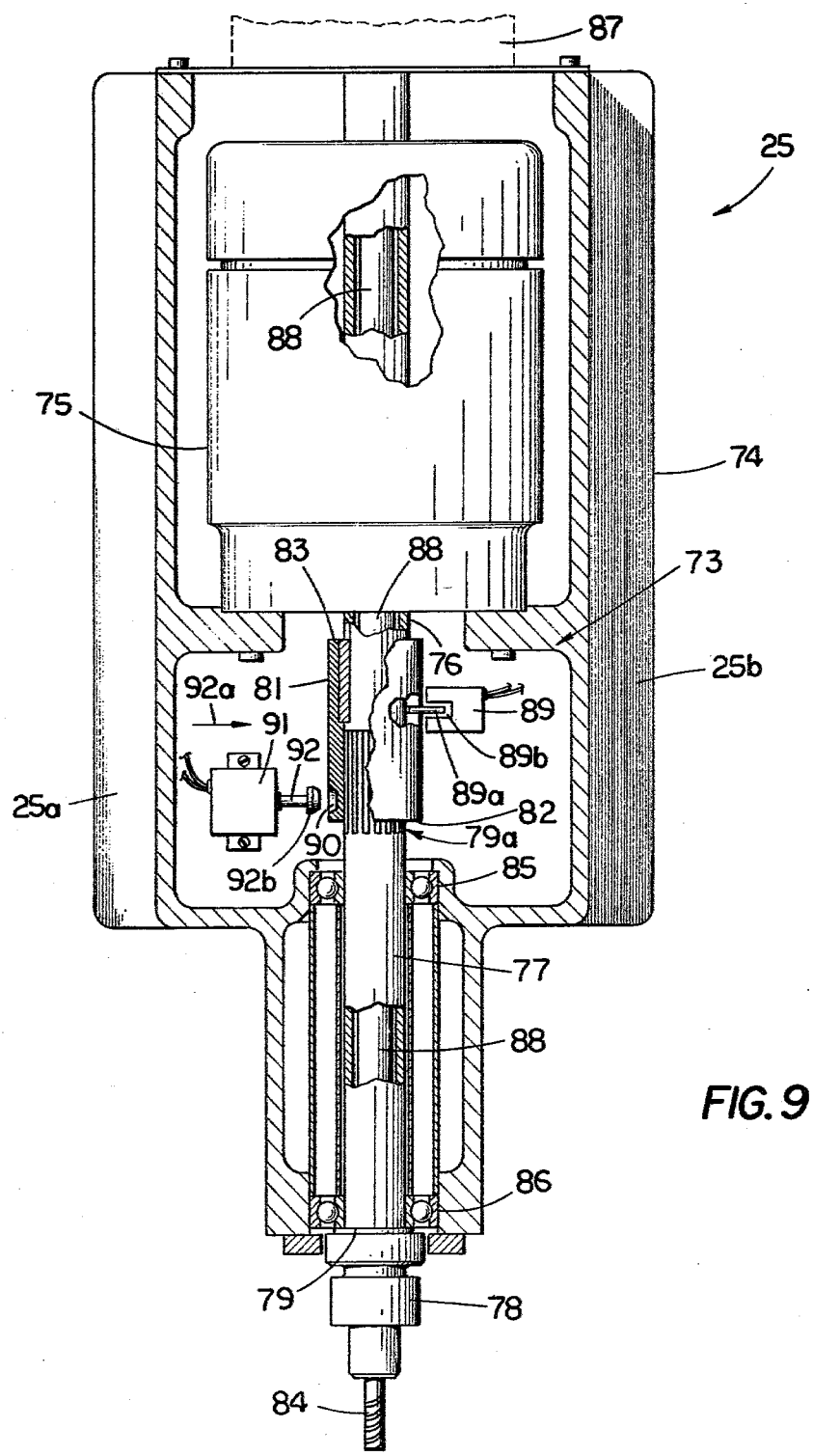
FIG. 9 is a fragmentary front view of a tool support and tool drive unit comprising a portion of the FIG. 1 milling machine.

Referring to FIG. 9, tool support member 25 is shown in greater detail. The outer frame member 74 includes flange members 25a and 25b which are the structural members to which circulating tracks 41 are mounted. Frame member 74 also houses a tool drive unit 73 which includes a variable frequency AC drive motor 75 having a vertically extending hollow output shaft 76, and a hollow spindle 77 having a tool chucking means 78 at one end 79 of the hollow spindle. Drive unit 73 provides rotary motion to the particular tool or milling cutter being used. The opposite end 79a of hollow spindle 77 is splined and is positioned coaxial to the output shaft 76 of motor 75. Splined end 79a of hollow spindle 77 is securely coupled to output shaft 76 by means of splined and keyed coupling 81. The internal portion of one end 82 of coupling 81 is correspondingly splined so as to engage splined end 79a of hollow spindle 77 and the opposite end 83 of coupling 81 mates with output shaft 76 and is keyed thereto in a conventional manner. Hollow spindle 77 is supported within structural frame 74 by means of bearings 85 and 86 so that there will be a true and accurate rotation of the milling cutter in response to the rotation of the output shaft 76 of drive motor 75. The axis of rotation of spindle 77 coincides with the longitudinal axis of the tool support member 25 as indicated by point P in FIG. 5. Tool chucking means 78 is used for securely holding an appropriate milling cutter 84 or similar tool. This tool chucking means may be either a manual or automatic device and the entire tool support and tool drive system is usable with an automatic tool changer a portion of which is shown by block 87 in which case the plunger portion 88 of the charger is located within hollow spindle 77. The output shaft 76 of motor 75 may be solid if automatic tool changing is not incorporated, and the tool changing will be done manually. When an automatic tool changer is used, the motor may preferably have a hollow motor shaft arrangement as shown, in order to accommodate a tool securing and releasing plunger 88 extending from the plunger operating mechanism (in block 87, FIG. 9) downward into the spindle.

A variable frequency motor controller in electrical control box 75a (see FIGS. 1 and 2) functions with variable frequency AC drive motor 75 to provide a constant 2 horsepower output over the range of speeds between approximately 400 rpm and 3500 rpm. With such as arrangement the torque will vary with the speed, but the horsepower will be held constant by electrically limiting the motor output.

A further feature of milling machine 20 is the monitoring of spindle rpm and the stopping of spindle rotation and subsequent locking of the spindle for purposes of tool changing and the like. Located within structural frame 74 and adjacent coupling 81 are an air cylinder 91 and a photoelectric switch 89. A circular tapered indentation 90 is machined into the lower portion of coupling 81 and in line with indentation 90 is the actuatable plunger 92 of cylinder 91. When actuated, plunger 92 moves in the direction of arrow 92a to an extended position contiguous to the surface of coupling 81. Positioned on the end of plunger 92 is a circular tapered plug 92b which is sized to seat within indentation 90 and will prevent continued spindle rotation when so seated. Although once plunger 92 is actuated plug 92b may initially ride against the surface of coupling 81, if the identation is not in line, when the indentation rotates into alignment, plug 92b will snap into indentation 90 and stop further rotation of spindle 77.

Spring pin 89a is inserted into a drilled hole in the upper portion of coupling 81 where it is securely held. The outwardly extending end of pin 89a passes through slot 89b of photoelectric switch 89. With milling machine 20 in use there is a path of light, created by one side of switch 89, which passes across slot 89b and is sensed on the opposite side, and with each revolution of coupling 81, pin 89a passes through this path of light causing a momentary break. By means of suitable conventional electronic circuitry within electrical control box 95 (FIGS. 2 and 3) these momentary breaks may be counted to produce a signal representative of spindle speed. When it is desired to stop spindle 77 for a change of tools, or for some other reason, an appropriate operator control turns off power to motor 75 and the rate of rotation decreases. When the spindle speed is low enough, cylinder 91 is energized and actuates plunger 92 into an extended position against coupling 81 and ultimately into indentation 90. A suitable optical switch for this application is a model CL 155 offered by Clairex Electronics of Mount Vernon, New York.

Automatic tool changer and the necessary tool holder apparatus are not specifically detailed herein except for the positional location of the changer portion indicated by block 87 and the plunger and their relationship to the drive motor 75 and hollow spindle 77. It is to be understood that the particular tool changer and tool holder selected will depend upon the size of milling machine 20 and the various machining capabilities desired, and inasmuch as such apparata are well known in the art, further mechanical and electrical details are not felt to be necessary.

By mounting a variable speed AC drive motor 75 of ample power potential in a direct coaxial arrangement with hollow spindle 77 and securing both members within structural frame 74, there is no need for gears, belts or pulleys in order to effect a variety of desirable speeds of rotation of the particular milling cutters which may be inserted within tool chucking means 78.

Although only a single motor and single spindle system has been described, it is to be understood that the concepts of removable ball bearing ways for the tool support member and the direct coaxial connection between the hollow spindle and its drive motor are principles which are equally applicable to multiple spindle milling machines. With such multiple spindle machines, the width of the C-shaped frame would necessarily increase and multiple tool support member assemblies may be mounted on a correspondingly increased number of outwardly extending arms 29. Likewise, some of the features disclosed herein are equally applicable for use with different types of milling machines or milling operations other than the conventional knee-and-column-type milling machines. For example, the removable ball bearing way concept and the direct coaxial drive concept could be employed on transfer base milling, reciprocable milling and string milling with virtually no modification needed to what has already been described.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A milling machine comprising:
    (a) a C-shaped frame having a base portion and an overhanging upper portion;
    (b) a tool support member suspended from said overhanging upper portion and movable in a vertical direction;
    (c) a saddle member supported by said base portion, positioned beneath said tool support member and movable in a transverse direction;
    (d) a work table positioned atop said saddle member and movable in a longitudinal direction;
    (e) a tool drive unit supported by and movable with said tool support member and including a drive motor having an output shaft extending therefrom and a rotatable tool spindle non-rotatably connected to said output shaft;
    (f) a first plurality of recirculating anti-friction bearing ways having a common plane of vertical travel, said common plane being substantially coincident with the axis of rotation of said tool spindle, said ways being spaced about said tool support member and positioned between said C-shaped frame and said tool support member;
    (g) each of said first plurality of bearing ways having a circulating track portion and an outer race portion;
    (h) a second plurality of bearing ways located between said saddle member and said C-shaped frame;
    (i) a third plurality of bearing ways located between said work table and said saddle member;
    (j) a separate ball lead screw and DC motor combination associated with each of the three directions of movement and suitably arranged to control movement in each of the three directions; and
    (k) said output shaft extends in a vertical direction and said tool spindle is hollow and coaxial with said output shaft.

2. The milling machine of claim 1 in which each of said pluralities of bearing ways is individually mounted as part of said milling machine by means of threaded fasteners, said bearing ways being individually removable from said milling machine by removal of said threaded fasteners.

3. The milling machine of claim 2 wherein said tool support member further includes an optical switch and brake combination acting on said hollow tool spindle to restrict rotation thereof when said switch and brake combination is activated.

4. The milling machine of claim 3 in which said hollow spindle has a tool chuck device at one end and an externally splined surface at the other end, said spindle being bearingly supported and aligned with said output shaft by said tool support member.

5. The milling machine of claim 4 wherein said hollow spindle is coaxially connected to said drive motor output shaft by a coupling internally splined at one end and mating with said externally splined surface and keyed to said output shaft at the other end.

6. The milling machine of claim 5 wherein said drive motor is a variable frequency alternating current drive motor.

7. The milling machine of claim 6 wherein said drive motor is electrically controlled so as to have a constant output of two horsepower over the range of 400 rpm to 3500 rpm.

8. A milling machine comprising:
    (a) a C-shaped frame having a base portion and an overhanging upper portion;
    (b) a tool support member suspended from said overhanging upper portion and movable in a vertical direction;
    (c) a saddle member supported by said base portion, positioned beneath said tool support member and movable in a transverse direction;
    (d) a work table positioned atop said saddle member and movable in a longitudinal direction;
    (e) a tool drive unit supported by and movable with said tool support member and including a hollow shaft drive motor and a hollow tool spindle connected thereto;
    (f) a first plurality of recirculating anti-friction ball bearing ways, said ways being spaced about said tool support member and positioned between said C-shaped frame and said tool support member;
    (g) a second plurality of recirculating anti-friction ball bearing ways located between said saddle member and said C-shaped frame;
    (h) a third plurality of recirculating anti-friction ball bearing ways located between said work table and said saddle member; and
    (i) three separate lead screw and D.C. motor combinations, there being a different one of said combinations controlling movement in each of said three directions.

9. The milling machine of claim 8 which further includes an automatic tool changer communicating with said hollow shaft drive motor and having a tool extraction plunger positioned within said hollow tool spindle.

10. The milling machine of claim 9 in which each of said pluralities of ball bearing ways is individually removable.

11. A milling machine comprising:
    (a) a C-shaped frame having a base portion and an overhanging upper portion;
    (b) a tool support member suspended from said overhanging upper portion and movable in a vertical direction;
    (c) a saddle member supported by said base portion, positioned beneath said tool support member and movable in a transverse direction;
    (d) a work table positioned atop said saddle member and movable in a longitudinal direction;
    (e) a tool drive unit supported by and movable with said tool support member and including a hollow shaft drive motor and a hollow tool spindle connected thereto;
(f) a first plurality of recirculating anti-friction bearing ways, said ways being spaced about said tool support member and positioned between said C-shaped frame and said tool support member;
(g) a second pluarlity of anti-friction bearing ways located between said saddle member and said C-shaped frame;
(h) a third plurality of anti-friction bearing ways located between said work table and said saddle member;
(i) a separate lead screw and DC motor combination associated with each of the three directions of movement and suitably arranged to control movement in said three directions;
(j) an automatic tool changer communicating with said hollow shaft drive motor and having a tool extraction plunger positioned within said hollow tool spindle;
(k) each of said pluralities of bearing ways are ball bearing ways and are individually removable; and
(l) said tool support member further includes a cylinder having an actuatable plunger, said plunger communicating with said coupling to stop rotation of said spindle when said cylinder is energized.

12. The milling machine of claim 11 in which said hollow spindle has a tool chuck device at one end and externally splined surface at the other end, said spindle being bearingly supported and aligned by said tool support member.

13. The milling machine of claim 12 in which said motor is a variable frequency alternating current drive motor.

14. In a milling machine having a frame, tool support member vertically movable on the frame and a work table under said support member, the improvement comprising:
a tool mounting spindle rotatably retained within said support member;
an internally splined coupling; and
a tool drive motor having a hollow output shaft extending therethrough and externally splined at one end, said hollow output shaft being coaxially aligned with said spindle and directly coupled to said spindle by said internally splined coupling for directly driving said spindle.

15. The improvement of claim 14 wherein: said spindle is hollow.

16. The improvement of claim 15 wherein:
a linearly movable plunger extends entirely through said output shaft and at least partially through said spindle for securing and releasing a cutting tool mounted to said spindle.

17. The improvement of claim 14 wherein:
said motor is a variable frequency alternating current drive motor having a constant horsepower output at speeds between 500 and 3000 rpm.

18. The improvement of claim 14 and further comprising:
a cylinder mounted in said support member and operatively associated with said spindle to stop rotation at a precise position.

19. A milling machine comprising:
(a) a C-shaped frame having a base portion and an overhanging upper portion;
(b) a tool support member suspended from said overhanging upper portion and movable in a vertical direction;
(c) a saddle member supported by said base portion, positioned beneath said tool support member and movable in a transverse direction;
(d) a work table positioned atop said saddle member and movable in a longitudinal direction;
(e) a tool drive unit supported by and movable with said tool support member and including a drive motor having an output shaft extending therefrom and a rotatable tool spindle connected to said output shaft;
(f) a first plurality of recirculating anti-friction bearing ways, said ways being spaced about said tool support member and positioned between said C-shaped frame and said tool support member; and
(g) said tool support member further includes a photoelectric switch cooperatively arranged relative to said tool spindle to sense spindle RPM's and an air cylinder having an actuatable plunger, said plunger communicating with said tool drive unit to stop rotation of said spindle when said cylinder is energized, said photoelectric switch is electrically arranged to provide the energizing signal to said cylinder when a selected RPM rate is sensed by said photoelectric switch.

20. A three-axis milling machine comprising:
(a) a C-shaped frame integrally comprising a vertical column, a base portion outwardly extending from a lower portion of said vertical column and an outwardly extending overhanging upper portion, the outermost surface of said upper portion terminating in a vertical plane which is intermediate of said base portion;
(b) a tool support member disposed adjacent said overhanging upper portion and movable relative to said overhanging upper portion in a vertical direction, said tool support member having two oppositely disposed flange portions;
(c) a saddle member supported by said base portion, positioned beneath said tool support member and movable in a transverse direction;
(d) a work table positioned atop said saddle member and movable in a longitudinal direction;
(e) a tool drive unit rigidly attached to said tool support member and movable with said tool support member, said tool drive unit including a drive motor having an output shaft extending therefrom and a rotatable tool spindle coaxially connected to said output shaft;
(f) a first plurality of recirculating anti-friction bearing ways disposed on opposite sides of said tool support member, each bearing way being attached to a flange portion of said tool support member and to said overhanging upper portion; and
(g) said tool support member further including a cylinder having an actuatable plunger, said plunger communicating with said tool drive unit to stop rotation of said spindle when said cylinder is energized.

21. The three-axis milling machine of claim 20 wherein vertical movement of said tool support member is by means of a D.C. motor and lead screw secured to said overhanging upper portion and a cooperating ball nut secured to said tool support member.

22. The improvement of claim 14 wherein said internally splined coupling includes an indentation and said tool support member further includes a cylinder having an actuatable plunger, said plunger communicating with said indentation to stop rotation of said spindle when said cylinder is energized.

* * * * *